United States Patent
Tanishiki et al.

[11] Patent Number: 6,024,538
[45] Date of Patent: Feb. 15, 2000

[54] IMPELLER SHELL OF TORQUE CONVERTER AND METHOD OF FORMING THE SAME

[75] Inventors: Hideki Tanishiki; Yukiyoshi Takada, both of Neyagawa, Japan

[73] Assignee: Exedy Corporation, Neyagawa, Japan

[21] Appl. No.: 09/002,868

[22] Filed: Jan. 5, 1998

[30] Foreign Application Priority Data

Jan. 10, 1997 [JP] Japan .................................. 9-003380

[51] Int. Cl.[7] .............................. F01D 5/22; F16D 33/00
[52] U.S. Cl. .................. 416/197 C; 416/175; 416/180; 29/889; 72/348; 72/379.2; 60/330; 60/364
[58] Field of Search ................... 416/197 C, 175, 416/180; 29/889; 72/348, 379.2; 60/330, 364

[56] References Cited

U.S. PATENT DOCUMENTS

| | | | |
|---|---|---|---|
| 2,505,820 | 5/1950 | Zeidler | 416/180 |
| 2,694,478 | 11/1954 | Zeidler | 192/70.18 |
| 2,745,354 | 5/1956 | English et al. | 416/180 |
| 3,316,622 | 5/1967 | Jandasek et al. | 29/889.5 |
| 4,450,611 | 5/1984 | Ito et al. | 29/156.8 FC |
| 4,825,521 | 5/1989 | Frotschner et al. | 29/156.4 R |
| 5,346,366 | 9/1994 | Shinsuke et al. | 416/180 |
| 5,587,092 | 12/1996 | Chris et al. | 219/113 |

FOREIGN PATENT DOCUMENTS

| | | |
|---|---|---|
| 31 44 832 C2 | 6/1989 | Germany . |
| 36 14 504 C2 | 10/1989 | Germany . |
| 963394 | 7/1964 | United Kingdom . |
| 977027 | 12/1964 | United Kingdom . |

Primary Examiner—Edward K. Look
Assistant Examiner—Rhonda Barton
Attorney, Agent, or Firm—Shinjyu An Intellectual Property Firm

[57] ABSTRACT

An impeller shell 40*a* of a torque converter includes a main portion 41, a connection portion 42 and a stepped portion 43. The main portion 41 has a curved inner peripheral surface 41*a* carrying impeller blades, and is opposed to a turbine 5. The connection portion 42 has a cylindrical form larger in diameter than an outer periphery of the inner peripheral surface 41*a*, and is fixed to a front cover 3. The stepped portion 43 couples an end of the main portion 41 near an engine to an end of the connection portion 42 near a transmission. A corner portion formed of the inner peripheral surface 41*a* and a surface 43*a* near the engine has a radius set to 4 mm or less by preliminary forming by a press and subsequent finish forming by a press.

15 Claims, 5 Drawing Sheets

IMPELLER SHELL OF TORQUE CONVERTER AND METHOD OF FORMING THE SAME

BACKGROUND OF THE INVENTION

A. Field of the Invention

The present invention relates to an impeller shell of a torque converter, and in particular formation of the structure of an outer peripheral portion of the impeller shell as well as a method of forming the same.

B. Description of the Background Art

FIG. 4 is a schematic cross section of a typical torque converter known in the prior art. The torque converter is primarily formed of a front cover 3 and three kinds of vane wheels, i.e., an impeller 4, a turbine 5 and a stator 6, and operates to transmit torque from the front cover 3 to the turbine 5 and thereby outputting the torque to an output shaft (not shown) connected to the turbine 5. The impeller 4 has an impeller shell 4a, a plurality of impeller blades 4b attached to the inner side of the impeller shell 4a, and an impeller hub 4c fixed to an inner peripheral edge of the impeller shell 4a. The impeller shell 4a has an outer peripheral portion which is shown by solid line in FIG. 5.

Referring back to FIG. 4, the turbine 5 has a turbine shell 5a and a plurality of turbine blades 5b attached to the turbine shell 5a. When the impeller 4 rotates together with the front cover 3, a working fluid having a velocity energy circulates through the impeller 4, turbine 5 and stator 6 in accordance with the rotation of the impeller 4 so that the turbine 5 absorbs the velocity energy of the working fluid to rotate the output shaft. In this operation, the working fluid in the radially outer portion of the torque converter flows from the impeller 4 toward the turbine 5.

The performance of the torque converter is affected by energy losses as the working fluid moves in a flow path within the torque converter. Energy losses of the working fluid are significantly affected by the configuration of the flow path within the torque converter, the configuration of the vanes and others.

In the torque converter, the impeller 4 and the turbine 5 are opposed to each other, but a space is defined between the impeller 4 and the turbine 5. Therefore, the working fluid, which flows in the radially outer portion of the torque converter from a region proximate the impeller 4 toward the turbine 5, does not entirely flow toward the inner periphery of the turbine 5. Instead, a portion of the working fluid flows toward a position radially outside the turbine 5 through the above mentioned space along a path generally represented by the arrow W. The flow of fluid along the path W is undesirable and causes energy losses in the working fluid.

For suppressing such energy losses, an ideal shape is desired for the inner surface the outer peripheral portion of the impeller shell 4a that has a sectional form represented by a dotted line in FIG. 5. However, in manufacturing processes, the impeller shell 4a is usually formed by press working metal. Therefore, the impeller shell 4a which is a pressed product has a sectional form represented by solid line in FIG. 5. Consequently, a portion of the working fluid flows toward a position or region radially outside the turbine shell 5a (i.e., a region above the shell 5a in FIG. 5) as indicated by an arrow in FIG. 5, which reduces the torque transmission efficiency of the torque converter.

SUMMARY OF THE INVENTION

An object of the invention is to reduce energy losses due to the flow of the working fluid from the impeller to areas other than the turbine, and thereby improve the performance of the torque converter.

In accordance with one aspect of the present invention, an impeller shell of a torque converter includes a main portion having a curved inner peripheral surface supporting a plurality of impeller blades. The impeller blades are opposed to corresponding turbine blades. A connection portion has a cylindrical shape larger in diameter than an outer periphery of the inner peripheral surface of the main portion. The connection portion is configured for attachment to a front cover of a torque convertor. A stepped portion is formed between the connection portion and a radial outer portion of the curved inner peripheral surface. A corner portion is formed between the inner peripheral surface of the main portion and an inner surface of the stepped portion is formed with a radius that is less than about 4 mm by press forming.

In another aspect of the present invention, an impeller shell of a torque converter includes a main portion having a curved inner peripheral surface supporting a plurality of impeller blades. The impeller blades are opposed to corresponding turbine blades. The main portion is configured to rotate about a central axis. An inner surface of a radial outer end of the turbine blades define a cylindrical surface A which extends parallel to the central axis. A connection portion has a cylindrical shape larger in diameter than an outer periphery of the inner peripheral surface of the main portion. The connection portion is configured for attachment to a front cover of a torque convertor. A stepped portion is formed between the connection portion and a radial outer portion of the curved inner peripheral surface. The stepped portion has an inner surface that defines a plane B which extends in a direction generally perpendicular to the central axis. The intersection of the surface A and the plane B defines a nodal line C and the intersection of the surface A with a radially outer portion of the curved inner peripheral surface of the main portion defines a position D on the inner peripheral surface and the position D is spaced by a distance of no more than 3 mm from the plane B as a result of press forming of the impeller shell.

Preferably, the plane B coincides with radially extending edges of the impeller blades adjacent to the turbine and the nodal line C coincides with a corner of radially outward ends of the impeller blades.

Preferably, the plane B intersects the surface of the stepped portion at a position E that spaced by a distance of no more than 3 mm from the surface A as a result of the press forming.

Preferably, a curved surface F extends between the inner peripheral surface of the main portion and the inner surface of the stepped portion and a distance between the curved surface and the nodal line C is no greater than 1 mm as a result of press forming.

In accordance with yet another aspect of the present invention, an impeller shell of a torque converter includes a main portion having a curved inner peripheral surface supporting a plurality of impeller blades. The impeller blades are opposed to corresponding turbine blades. The main portion is configured to rotate about a central axis. An inner surface of a radial outer end of the turbine blades defines a cylindrical surface A which extends parallel to the central axis. A connection portion has a cylindrical shape larger in diameter than an outer periphery of the inner peripheral surface of the main portion. The connection portion is configured for attachment to a front cover of a torque convertor. A stepped portion is formed between the connection portion and a radial outer portion of the curved inner peripheral surface. The stepped portion has an inner surface that defines a plane B which extends in a direction generally perpendicular to the central axis. The intersection of the surface A and the plane B defines a nodal line C and the intersection of the surface A with a radially outer portion of the curved inner peripheral surface of the main portion defines a position D on the inner peripheral surface. The position D extends generally parallel to the central axis. The position D is spaced by a distance of no more than 3 mm from the plane B. An the inner surface of the stepped portion a center portion is defined which is inclined at a gradient of no more than 25/100 with respect to the plane B.

Preferably, the plane B the inner surface of the stepped portion at a position E which is spaced by a distance of no more than 3 mm from the surface A.

Preferably, a curved surface F extends between the inner peripheral surface of the main portion and the inner surface of the stepped portion and a distance between the curved surface and the nodal line C is no greater than 1 mm.

In accordance with another aspect of the present invention, an impeller shell of a torque converter includes a main portion having a curved inner peripheral surface supporting a plurality of impeller blades. The impeller blades are opposed to corresponding turbine blades. The main portion is configured to rotate about a central axis. An inner surface of a radial outer end of the turbine blades defines a cylindrical surface A which extends parallel to the central axis. A connection portion has a cylindrical shape larger in diameter than an outer periphery of the inner peripheral surface of the main portion. The connection portion is configured for attachment to a front cover of a torque convertor. A stepped portion is formed between the connection portion and a radial outer portion of the curved inner peripheral surface. The stepped portion has an inner surface that defines a plane B which extends in a direction generally perpendicular to the central axis. Further, the impeller shell is formed by a multiple step press forming process including a first step including initial forming and a second step including forming by a plurality of dies including a first die surface extending substantially parallel to the central axis of the torque converter for forming the inner peripheral surface of the main portion, and a second die surface extending perpendicular to the first die surface and parallel to the plane B for forming the inner surface of the stepped portion.

Preferably, a nodal line C is defined at the intersection of the surface A and the plate B is further defined at an intersection of the first and second die surfaces as the first and second die surfaces are pressed toward one another. The notal line C is shifted toward a transmission side of the impeller shell during the second step by a distance of between 1 mm to 5 mm.

Preferably, during the press forming process, a corner portion is formed which extends between the inner peripheral surface of the main portion and the inner surface of the stepped portion. The corner portion has a radius of no more than 4 mm after the second step.

Preferably, the intersection of the surface A with a radially outer portion of the curved inner peripheral surface of the main portion defines a position D on the inner peripheral surface, the position D extending generally parallel to the central axis. The position D is spaced apart from the nodal line C by a distance of no more than 3 mm. The plane B intersects the surface of the stepped portion at a position E that is spaced apart a distance of no more than 3 mm from the surface A.

Preferably, a corner portion is formed which extends between the inner peripheral surface of the main portion and the inner surface of the stepped portion. The corner portion has a radius of no more than 4 mm and being spaced apart from the nodal line C by a distance of no more than 1 mm.

In accordance with a further aspect of the present invention, a method of forming an impeller shell of the torque converter includes a first step of press forming a main portion, a connection portion, and a stepped portion. The main portion includes a curved inner peripheral surface for subsequently supporting a plurality of impeller blades. The connection portion has a cylindrical shape larger in diameter than an outer periphery of the inner peripheral surface of the main portion. The connection portion is configured for attachment to a front cover of a torque convertor. The stepped portion is formed between the connection portion and a radial outer portion of the curved inner peripheral surface. A second step includes press forming on the stepped portion to form an inner surface a portion of which defines a plane B which extends generally perpendicular to the central axis of the impeller shell and a corner portion which extends between the inner peripheral surface of the main portion and the inner surface of the stepped portion is formed with a radius that no more than about 4 mm.

Preferably, the main portion and the connection portion are axially moved relatively toward each other in the second step.

Preferably, a concavity is formed at the outer periphery of the main portion in the first step, and an engagement die having a convexity engageable with the concavity on the main portion is used such that the convexity of the engagement die is engaged with the concavity on the main portion for axially moving the main portion and the connection portion relatively toward each other in the second step.

In the present invention, the corner portion is formed on the inner peripheral surface of the main portion and the surface of the stepped portion near the engine has the radius of 4 mm or less, which is set by performing the press working multiple times, i.e., by performing the preliminary forming by the press and the finish forming by the press. Thereby, a working fluid which flows radially outward along the curved inner peripheral surface of the main portion is restrained from smoothly flowing at the radially outer portion of the torque converter toward a position radially outside the turbine. This suppresses an energy loss during flow of the working fluid from the impeller side to the turbine side. Thus, it is possible to increase the proportion of working fluid, which flows toward the radially inner side of the turbine, with respect to the whole working fluid, which flows at the radially outer portion of the torque converter from the impeller shell side toward the turbine side, and therefore an efficiency of the torque transmission from the impeller to the turbine can be increased.

In order to restrain the working fluid, which flows at the radially outer portion of the torque converter from the impeller side to the turbine side, from flowing toward the position radially outside the turbine, it is desired that the main portion of the impeller shell has an inner peripheral surface of which outer peripheral portion is not located radially outside the outer periphery of the inner peripheral surface of the turbine shell. According to an impeller shell produced by press forming in the prior art, the inner peripheral surface of the main portion of the impeller shell extends from a position, which is shifted toward the transmission by a large distance from the radially outer end of the impeller blade near the engine, to a position radially outside the outer periphery of the inner peripheral surface of the turbine shell. In contrast to this, the impeller shell according to the present invention has such a structure that, as a result of performing the press forming multiple times, i.e., by performing the preliminary forming by the press and the finish forming by the press, a position D, from which the inner peripheral surface of the main portion of the impeller shell extends radially outward beyond the outer periphery of the inner peripheral surface of the turbine shell, is shifted by a distance of 3 mm or less toward the transmission from the radially outer end of the impeller blade near the engine. At the vicinity of the end of the main portion near the engine, therefore, a vector of the working fluid flowing radially outward along the curved inner peripheral surface of the main portion can have a direction closer to the direction parallel to the axis of the torque converter than the prior art. Thus, flow of the working fluid toward the position radially outside the turbine is suppressed at the radially outer portion of the torque converter. This suppresses an energy loss during flow of the working fluid from the impeller side to the turbine side.

According to an impeller shell produced by press forming in the prior art, the surface of the stepped portion near the engine is inclined at a large gradient with respect to the plane perpendicular to the axis of the torque converter. For avoiding interference with the turbine, therefore, the inner peripheral surface of the main portion of the impeller shell must extend from a position, which is shifted from the turbine by a large distance toward the transmission, to a position radially outside the radially outer end of the impeller blade near the engine. According to the impeller shell of the present invention, a portion of the surface of the stepped portion near the engine is inclined at a gradient of 25/100 or less with respect to the plane perpendicular to the axis of the torque converter owing to the press forming performed multiple times, i.e., the preliminary forming by the press and the finish forming by the press. Thereby, the position D, from which the inner peripheral surface of the main portion of the impeller shell extends radially outward beyond the radially outer end of the impeller blade near the engine, can be moved toward the turbine. This suppresses the working fluid at the radially outer portion of the torque converter from flowing to the position radially outside the turbine, and therefore can suppress an energy loss of the working fluid flowing from the impeller side to the turbine side.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
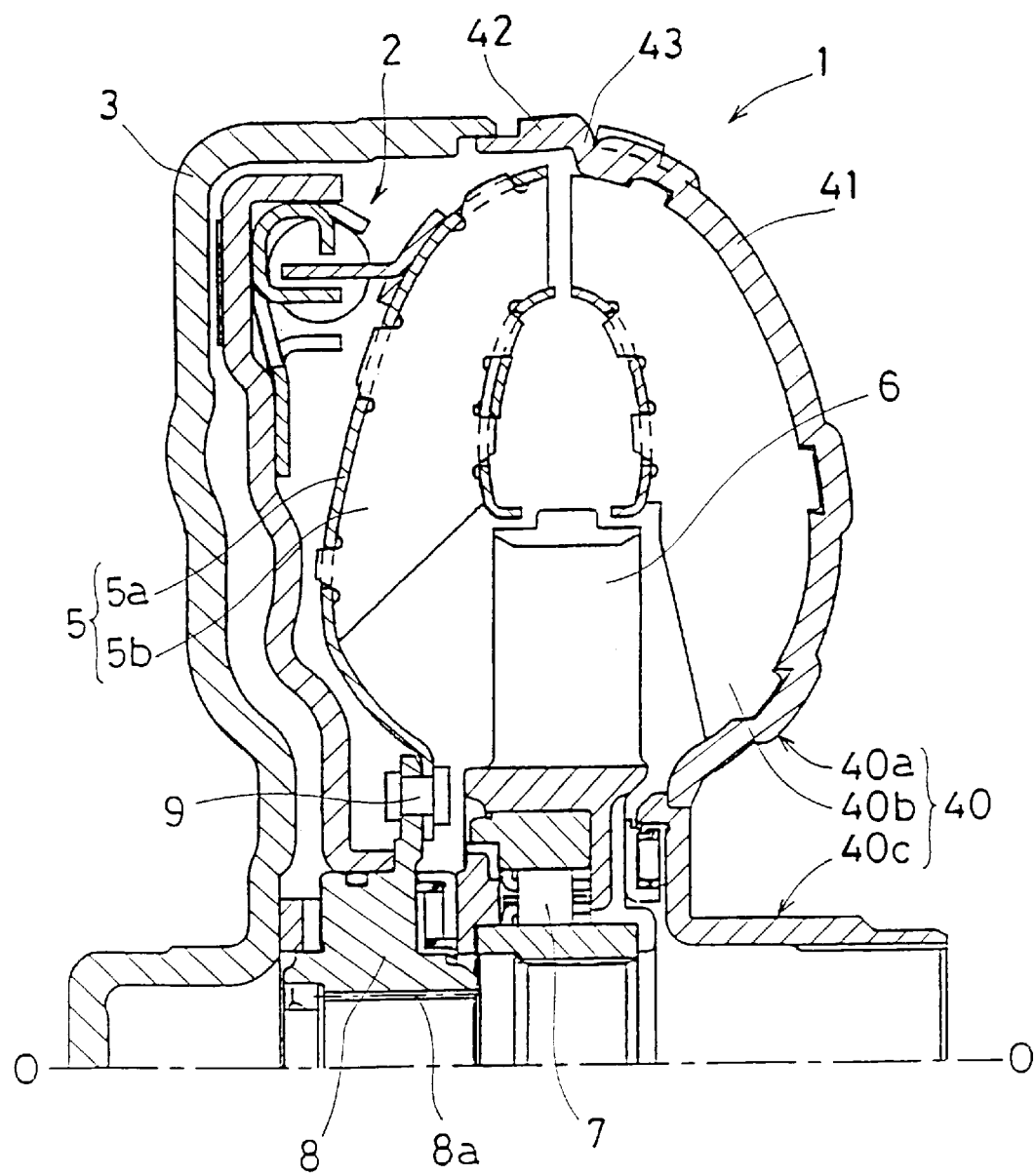
FIG. 1 is a cross section of a torque converter in accordance with one embodiment of the present invention.

FIG. 1 shows a torque converter 1 in accordance with one embodiment of the present invention. In FIG. 1, O—O represents a rotation axis of a torque converter 1. Although not shown, an engine is disposed to the left side of FIG. 1, and a transmission is disposed to the right side of FIG. 1.

The torque converter 1 is a mechanism for transmitting torque from a crank shaft of the engine to a main drive shaft of the transmission, and is primarily formed of a front cover 3 connected to the crank shaft of the engine through a flexible plate, an impeller 40 including an impeller shell 40a of an embodiment, a turbine 5, a stator 6 and a lockup clutch 2. The front cover 3 and the impeller shell 40a of the impeller 40 are welded together at their outer peripheral portions, and form a working fluid chamber between them.

The impeller 40 is formed of the impeller shell 40a, a plurality of impeller blades 40b fixed to the inner side of the impeller shell 40a and an impeller hub 40c fixed to the radially inner end of the impeller shell 40a.

The impeller shell 40a is formed of a main portion 41, a connection portion 42 and a stepped portion 43. The main portion 41 is opposed to the turbine 5, and has a curved inner peripheral surface 41a. The radially outer portion of the inner peripheral surface 41a includes a parallel portion 41b which is substantially parallel to the rotation axis O—O. The inner peripheral surface 41a carries impeller blades 40b attached thereto. The connection portion 42 has a cylindrical form larger in diameter than the outer periphery of the inner peripheral surface 41a of the main portion 41, and is fixed to the front cover 3. The stepped portion 43 couples the end of the main portion 41 near the engine to the end of the connection portion 42 near the transmission. A specific configuration of the impeller shell 40a and a method of forming the same is described below.

The turbine 5 is opposed to the main portion 41 of the impeller shell 40a in the working fluid chamber, and is primarily formed of a turbine shell 5a and a plurality of turbine blades 5b fixed to the turbine shell 5a. The inner peripheral portion of the turbine shell 5a is fixed to a flange of the turbine hub 8 by a plurality of rivets 9. The turbine hub 8 is provided at its inner periphery with a spline aperture 8a for coupling the hub 8 to the main drive shaft extending from the transmission.

The stator 6 is arranged between the impeller 40 and the turbine 5, and is fixed to a stator shaft fixed to a housing of the transmission through a one-way clutch 7.

The lockup clutch 2 is a mechanism for mechanically coupling the front cover 3 to the turbine 5, and is arranged between the front cover 3 and the turbine 5.

A working fluid will now be described below.

The working fluid chamber formed between the front cover 3 and the impeller shell 40a is filled with the working fluid for hydraulically coupling the impeller 40 to the turbine 5 and controlling the lockup clutch 2. The working fluid is supplied through a space between the turbine hub 8 and the inner periphery of the front cover 3, and flows to the vicinity of the outer periphery of the turbine 5 through a space between the lockup clutch 2 and the front cover 3. The working fluid thus supplied flows through a space between the outer periphery of the main portion 41 of the impeller shell 40a and the outer periphery of the turbine shell 5a into a space defined between the impeller 40 and the turbine 5, and then flows out through a space between the inner periphery of the stator 6 and the inner periphery of the turbine shell 5a. The working fluid circulating in this manner externally discharges a heat generated in the torque converter 1.

An operation of the torque converter 1 is described below.

Torque is supplied from the crank shaft of the engine to the front cover 3 through the unillustrated flexible plate. The torque is then transmitted to the impeller shell 40*a*. Thereby, the impeller 40 rotates so that the working fluid flows from a region near the impeller shell 40*a* to a region near the turbine 5. The turbine 5 rotates in accordance with this flow of the working fluid so that the torque of the turbine 5 is supplied to the main drive shaft through the turbine hub 8.

The impeller shell 40*a* is described below more in detail.

Although the method of pressing the impeller shell 40*a* is described below, the impeller shell 40*a* of this embodiment has a configuration which is achieved by the pressing method described below but cannot be achieved by a conventional pressing method. In the following description, a virtual or ideal configuration of the impeller shell 40*a* determined by design will be first defined, and then the configuration of the pressed impeller shell 40*a* will be described.

Figure 2:
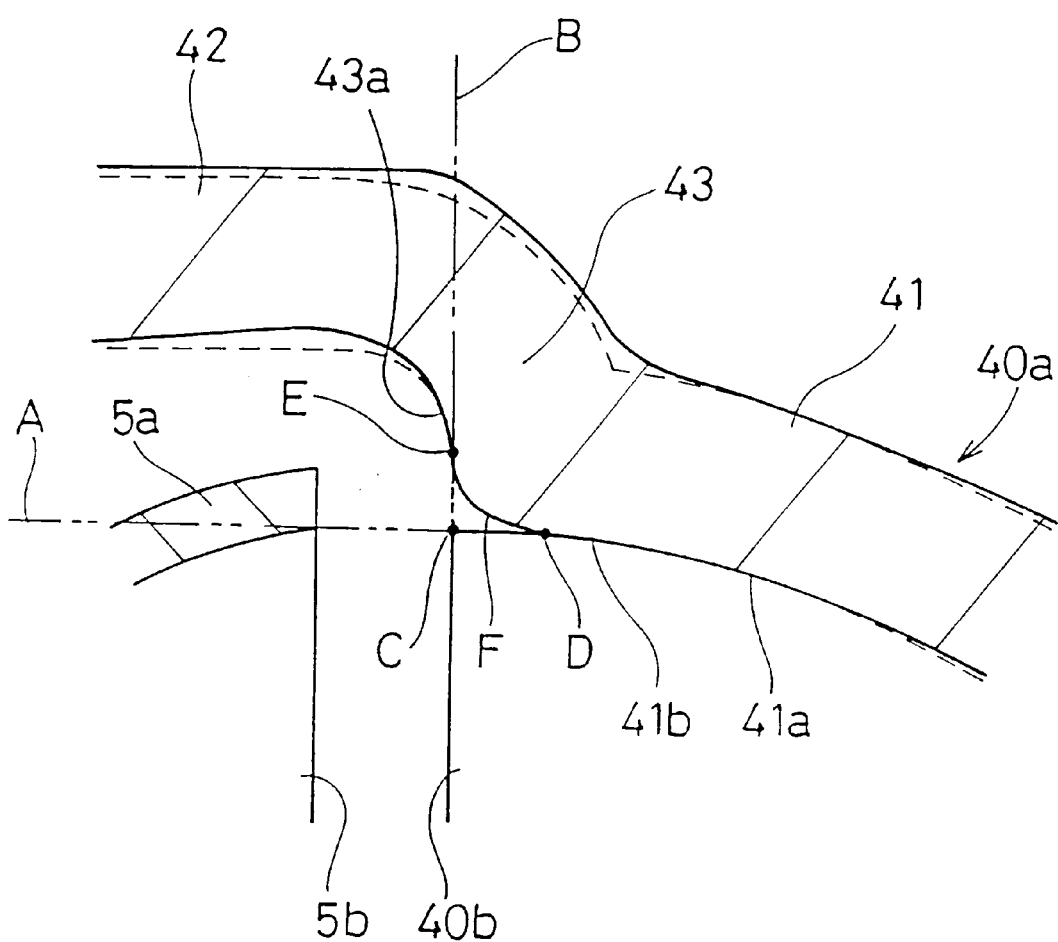
FIG. 2 is a fragmentary cross section of a portion of the torque convertor depicted in FIG. 1, on an enlarged scale, showing a radially outer portion of an impeller shell.

Referring generally to FIG. 2, if the inner peripheral surface 41*a* of the main portion 41 of the impeller shell 40*a* extends radially outward beyond the outer periphery of the inner peripheral surface of the turbine shell 5*a*, the proportion of the working fluid which flows from the radially outer portion of the impeller shell 40*a* to a position radially outside the turbine 5 increases. If the surface 43*a* of the stepped portion 43 near the engine side forms a large gradient with respect to the plane perpendicular to the axis of the torque converter, the main portion 41 must be shifted from a position near the turbine 5 toward the transmission for ensuring a predetermined space between the stepped portion 43 and the turbine shell 5*a*, resulting in increase in proportion of the working fluid which flows to a position radially outside the turbine 5 along the stepped portion 43.

In order to suppress the above fluid flow and corresponding energy loss, it is desirable for the impeller shell 40*a* to have the configuration represented by dotted line in FIG. 2. In the desired configuration, the parallel portion 41*b* of the inner peripheral surface 41*a* of the main portion 41 lies on an imaginary peripheral cylinder A. The imaginary peripheral cylinder A extends parallel to the rotation axis O—O and extends from the radially outermost periphery of the inner peripheral surface of the turbine shell 5*a* and further extends to the parallel portion 41*b* of the surface 41*a*. The stepped portion 43 defines the surface 43*a*. The surface 43*a* extends from the inner peripheral surface 41*a* to the connection portion 42. The surface 43*a* is located on a plane B which extends perpendicular to the rotation axis O—O and extends through the radially outer ends of the impeller blades 40*b* on the engine side thereof.

The present invention employs such a structure that, in order to improve the efficiency of the flow of the working fluid which flows at the radially outer portion of the torque converter 1 from the impeller shell 40*a* to the turbine 5, a distance of the outer periphery of the inner peripheral surface of the turbine shell 5*a* from the rotation axis O—O is equal to a distance of the radially outer end of the impeller blade 40*b* near the engine from the rotation axis O—O. Therefore, the parallel portion 41*b* of the inner peripheral surface 41*a* of the main portion 41 adjacent to the surface 43*a* of the stepped portion 43 on the engine side thereof is desirably located on the imaginary peripheral cylinder A. A nodal line or intersection between the imaginary peripheral cylinder A and the plane B is defined as the base nodal line C.

Description will now be given on the configuration of the pressed impeller shell 40*a*.

A position D is defined on the parallel portion 41*b* at a point where the inner peripheral surface A intersects the inner peripheral surface 41*a* of the main portion 41 is located at a distance of 3 mm or less from the plane B. A position E is defined at which the plane B intersects the surface 43*a* of the stepped portion 43 near the engine is located at a distance of 3 mm or less from the peripheral surface A.

The inner peripheral surface 41*a* of the main portion 41 continues to the surface 43*a* of the stepped portion 43 near the engine through a curved surface F. This curved surface F is spaced from the base nodal line C by a minimum distance of 1 mm or less. The curved surface F extends from the parallel portion 41*b* to the surface 43*a*.

The corner portion which is formed of the inner peripheral surface 41*a* of the main portion 41 of the impeller shell 40*a* and the surface 43*a* of the stepped portion 43 near the engine, i.e., the curved surface F has a radius of 4 mm or less.

The surface 43*a* of the stepped portion 43 near the engine has a portion which is inclined to the plane perpendicular to the rotation axis O—O at a gradient of 25/100 or less, and a plane which contains the center of this surface 43*a* and is perpendicular to the rotation axis O—O is substantially coincident with the plane B in this embodiment.

Figure 4:
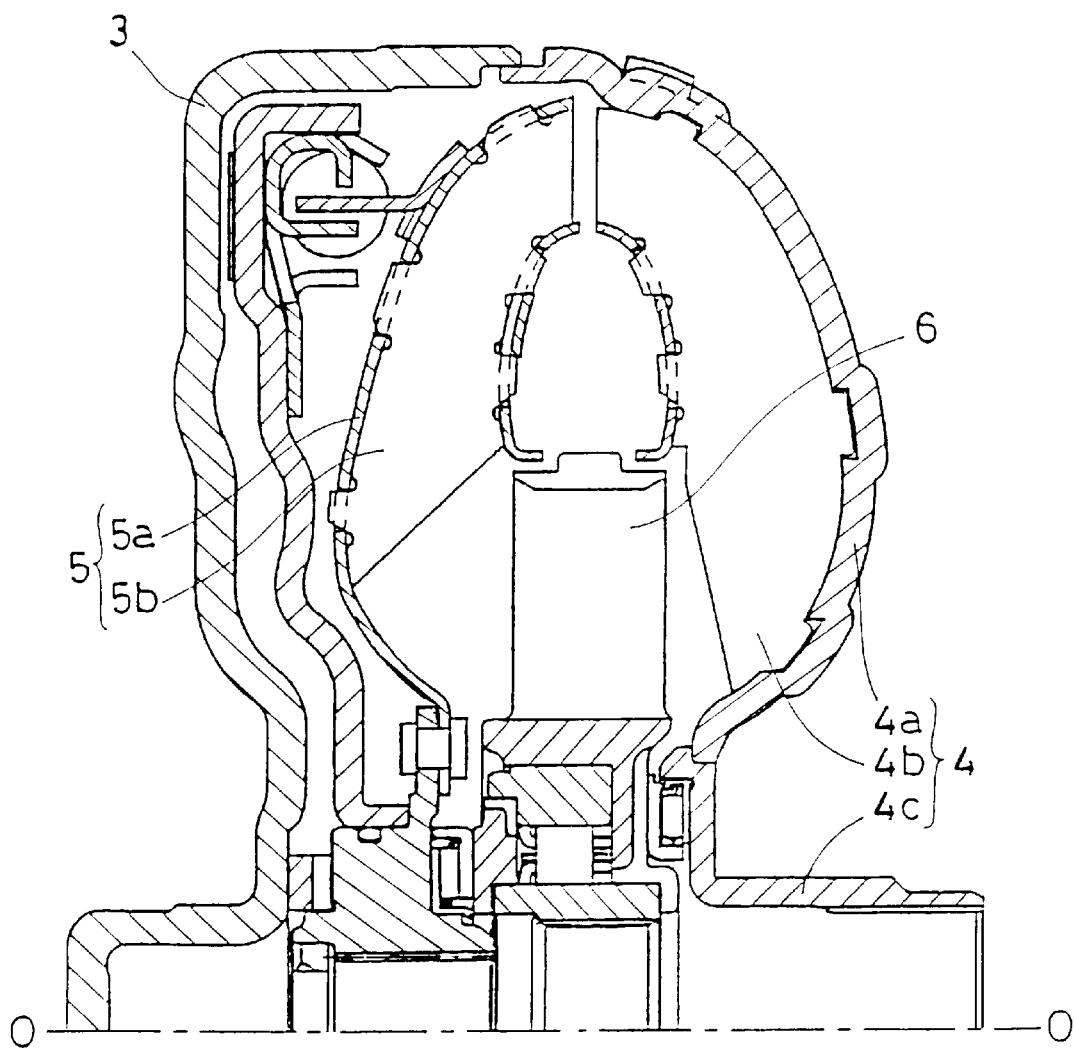
FIG. 4 is a cross section of a prior art torque converter.
Figure 5:
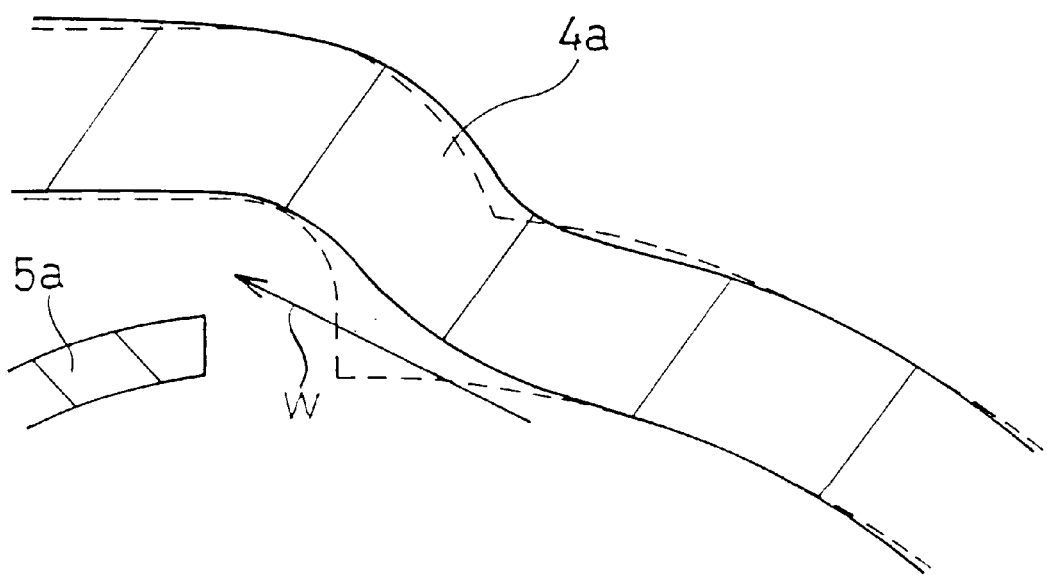
FIG. 5 is a fragmentary cross section of a portion of the torque convertor depicted in FIG. 4, on an enlarged scale, showing a radially outer portion of an impeller shell in solid lines with an idealized shape of a desired impeller shell superimposed in dashed lines over the prior art impeller shell.

Compared with the conventional torque converter shown in FIG. 4, the torque converter 1 employing the impeller shell 40*a* of the above configuration shown in FIG. 1 can improve the torque transmission efficiency through the entire speed ratio, and the improvement of the efficiency by about 1% on average is achieved.

A method of forming the impeller shell 40*a* will now be described below.

Figure 3:
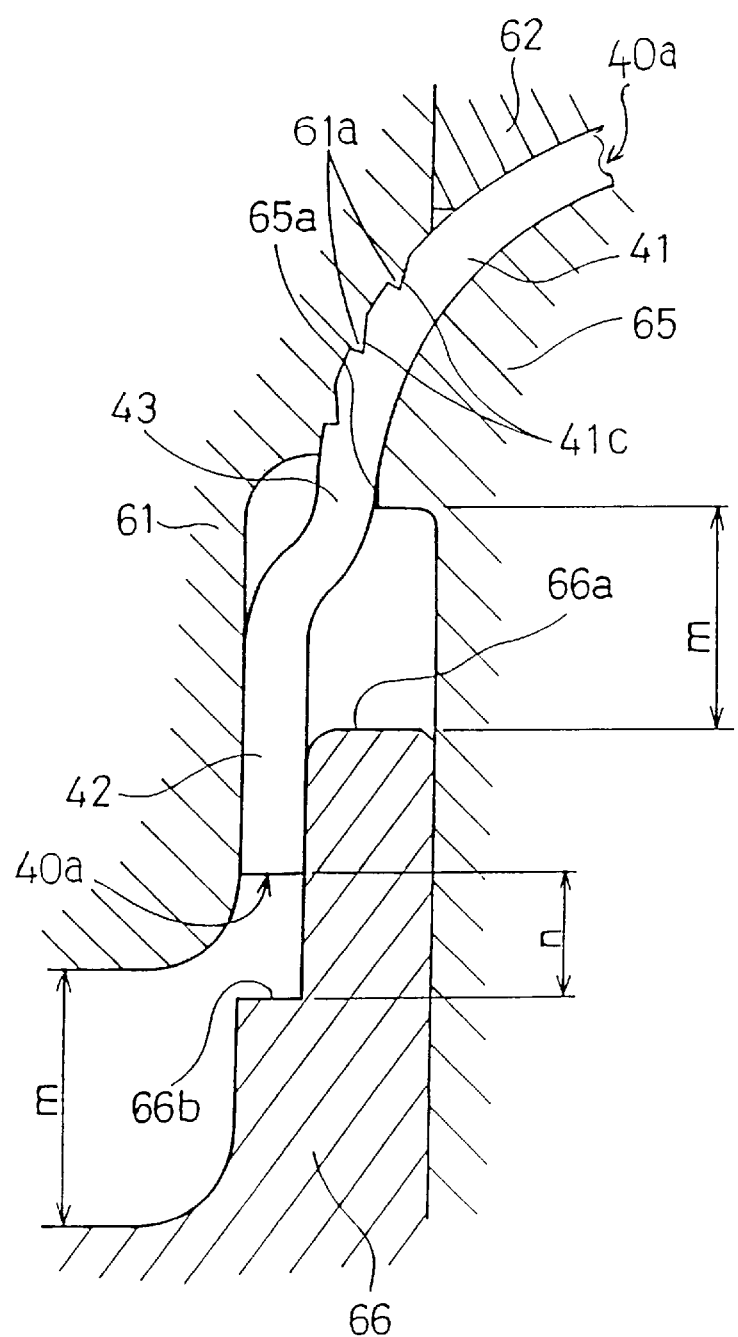
FIG. 3 is a fragmentary cross section view showing, a plurality of dies of a pressing apparatus used to form the impeller shell depicted in FIG. 2.

First, preliminary press forming is effected on a plate to form an impeller shell having the shape of the impeller shell 40*a* shown in FIG. 3. The impeller shell 40*a*, for instance, may be formed by pressing between the dies 61 and 65. However, separate dies (not shown) are preferably employed for the initial pressing of the impeller shell 40*a*.

The die 61 is formed of three sets of teeth or ridges which engage corresponding concavities 41*c* on the outer peripheral surface of the main portion 41 of the impeller shell 40*a*. In this embodiment, there are three such concavities 41*c*. However, the main portion 41 may alternatively employ only one concavity 41*c* provided that the concavity 41*c* has the function which is described below. Similarly, the die 61 may be formed with only one of the teeth or ridges which are engaged with the main portion 41 at the concavities 41*c*.

The impeller shell 40*a* is thereafter inserted between the dies 61 and 65 as shown in FIG. 3. Dies 62 and 66 are then used to complete the forming process of the impeller shell 41 along with other dies (not shown), as is shown in FIG. 3. In this embodiment, the shaping of the impeller shell 40*a* is performed by forcing the impeller shell 40*a* against the die 66. The dies 61, 62, 65 and others dies not shown, are all urged toward the die 66 thus deforming the impeller shell 40*a* into the shape shown in FIG. 2. It should be understood that the die 66 is depicted in FIG. 3 prior to deformation of the impeller shell 40*a*. Therefore, in FIG. 3, the impeller shell 40*a* does not yet have the desired shape shown in solid lines in FIG. 2.

The die 61 has surfaces which form the outer peripheral surfaces of the main portion 41, stepped portion 43 and connection portion 42, respectively. The surface forming the main portion 41 is provided with ridges 61*a* engaging with the foregoing concavities 41*c*. The die 65 has a first surface 65*a* forming the parallel portion 41*b* of the inner peripheral surface 41*a* of the main portion 41. The die 66 has a second surface 66*a* forming the surface 43*a* of the stepped portion 43 near the engine, and a third surface 66b pressing the end of the connection portion 42 near the engine side. The first surface 65a is substantially parallel to the rotation axis of the torque converter 1.

The second surface 66a is perpendicular to the first surface 65a and therefore extends perpendicularly to the rotation axis of the torque converter 1. A distance n of the third surface 66b from the end of the connection portion 42 located near the engine side thereof is shorter than a distance m which is a stroke of the press machine. In the finish pressing, the third surface 66b starts to press the end of the connection portion 42, which subsequently will be located near the engine side in the assembled state, in the middle of the pressing. Thereby, the connection portion 42 and the stepped portion 43 which are pressed tend to expand into the space defined by the dies 61, 65 and 66 so that these portions (particularly, the corner portion near the stepped portion 43) do not reduce their thicknesses, and can be easily pressed into the desired configuration. Although the connection portion 42 and the stepped portion 43 start to be deformed in the pressing operation, a portion of the main portion 41 radially inside the concavities 41c is hardly compressed so that unnecessary deformation is suppressed because the main portion 41 is supported by the ridges 61a of the die 61 through the concavities 41c.

In this embodiment, the above finish press forming is effected after the preliminary press forming to form the configuration of the outer peripheral portion of the impeller shell 40a as represented by solid line in FIG. 2.

According to the invention, the configuration of the outer peripheral portion of the impeller shell formed by the press forming is improved by performing the press forming multiple times and, in other words, by performing the preliminary forming by the press and the finish forming by the press. Therefore, it is possible to suppress the energy loss of the working fluid, which flows at the radially outer portion of the torque converter from the impeller side to the turbine side, and the torque transmission efficiency is improved.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. An impeller shell of a torque converter, the impeller shell comprising:
    a main portion having a curved inner peripheral surface supporting a plurality of impeller blades, the impeller blades being opposed to corresponding turbine blades;
    a connection portion having a cylindrical shape larger in diameter than an outer periphery of said curved inner peripheral surface of said main portion, said connection portion configured for attachment to a front cover of a torque convertor;
    a stepped portion formed between said connection portion and a radial outer portion of said curved inner peripheral surface; and
    wherein a corner portion formed between said curved inner peripheral surface of said main portion and an inner surface of said stepped portion is formed with a radius that is less than about 4 mm by press forming.

2. An impeller shell of a torque converter, the impeller shell comprising:
    a main portion having a curved inner peripheral surface supporting a plurality of impeller blades, the impeller blades being opposed to corresponding turbine blades, said main portion being configured to rotate about a central axis, an inner surface of a radial outer end of the turbine blades defining a cylindrical surface A which extends parallel to the central axis;
    a connection portion having a cylindrical shape larger in diameter than an outer periphery of said curved inner peripheral surface of said main portion, said connection portion configured for attachment to a front cover of a torque convertor;
    a stepped portion formed between said connection portion and a radial outer portion of said curved inner peripheral surface, said stepped portion having an inner surface that is generally parallel with a plane B which extends in a direction perpendicular to the central axis; and wherein
    the plane B extends through a center portion of said inner surface of said stepped portion and the plane B coincides with radially extending edges of said impeller blades adjacent to the turbine, the intersection of the surface A and the plane B defines a nodal line C, and the intersection of the surface A with a radially outer portion of said curved inner peripheral surface of said main portion defines a position D on said curved inner peripheral surface and said position D is spaced by a distance of no more than 3 mm from the plane B as a result of press forming of the impeller shell.

3. The impeller shell of the torque converter according to claim 2, wherein the surface A coincides with radially extending outer edges of said impeller blades adjacent to the turbine and said nodal line C coincides with a corner of radially outward ends of said impeller blades.

4. The impeller shell of the torque converter according to claim 2, wherein the plane B intersects said surface of said stepped portion at a position E that spaced by a distance of no more than 3 mm from the surface A as a result of the press forming.

5. The impeller shell of the torque converter according to claim 2, wherein a curved surface F extends between said curved inner peripheral surface of said main portion and said inner surface of said stepped portion and a distance between said curved surface F and the nodal line C is no greater than 1 mm as a result of press forming.

6. An impeller shell of a torque converter, the impeller shell comprising:
    a main portion having a curved inner peripheral surface supporting a plurality of impeller blades, the impeller blades being opposed to corresponding turbine blades, said main portion being configured to rotate about a central axis, an inner surface of a radial outer end of the turbine blades defining a cylindrical surface A which extends parallel to the central axis;
    a connection portion having a cylindrical shape larger in diameter than an outer periphery of said curved inner peripheral surface of said main portion, said connection portion configured for attachment to a front cover of a torque convertor;
    a stepped portion formed between said connection portion and a radial outer portion of said curved inner peripheral surface, said stepped portion having an inner surface that is generally parallel with a plane B which extends in a direction perpendicular to the central axis, the plane B extending through a generally central portion of said inner surface of said stepped portion;
    wherein
    the intersection of the surface A and the plane B defines a nodal line C and the intersection of the surface A with a radially outer portion of said curved inner peripheral surface of said main portion defines a position D on said curved inner peripheral surface, said position D is spaced by a distance of no more than 3 mm from the plane B, said central portion of said inner surface of said stepped portion is inclined at a gradient of no more than 25/100 with respect to the plane B, and wherein a curved surface F extends between said curved inner peripheral surface of said main portion and said inner surface of said stepped portion and a distance between said curved surface F and the nodal line C is no greater than 1 mm.

7. The impeller shell of the torque converter according to claim 6, wherein the plane B intersects with said inner surface of said stepped portion at a position E which is spaced by a distance of no more than 3 mm from the surface A.

8. An impeller shell of a torque converter, said impeller shell comprising:

a main portion having a curved inner peripheral surface supporting a plurality of impeller blades, the impeller blades being opposed to corresponding turbine blades, said main portion being configured to rotate about a central axis, an inner surface of a radial outer end of the turbine blades defining a cylindrical surface A which extends parallel to the central axis;

a connection portion having a cylindrical shape larger in diameter than an outer periphery of said curved inner peripheral surface of said main portion, said connection portion configured for attachment to a front cover of a torque convertor;

a stepped portion formed between said connection portion and a radial outer portion of said curved inner peripheral surface, said stepped portion having an inner surface that is generally parallel with a plane B which extends in a direction perpendicular to the central axis, the plane B further extending though a generally central portion of said inner surface of said stepped portion and coinciding with an edge of said impeller blades adjacent to the turbine; and wherein said impeller shell is formed by a multiple step press forming process including a first step including initial forming and a second step including forming by a plurality of dies including a first die surface extending substantially parallel to the central axis of said torque converter for forming said curved inner peripheral surface of said main portion, and a second die surface extending perpendicular to said first die surface and parallel to the plane B for forming said inner surface of said stepped portion.

9. The impeller shell of the torque converter according to claim 8, wherein a nodal line C defined at the intersection of the surface A and the plane B is further defined at an intersection of said first and second die surfaces as said first and second die surfaces are pressed toward one another, said nodal line C being shifted toward a transmission side of the impeller shell during the second step by a distance of between 1 mm to 5 mm.

10. The impeller shell of the torque converter according to claim 9, wherein during said press forming process, a corner portion is formed which extends between said curved inner peripheral surface of said main portion and said inner surface of said stepped portion, said corner portion having a radius of no more than 4 mm after said second step.

11. The impeller shell of the torque converter according to claim 9, wherein the intersection of the surface A with a radially outer portion of said curved inner peripheral surface of said main portion defines a position D on said curved inner peripheral surface, said position D extending generally parallel to the central axis, the position D being spaced apart from the nodal line C by a distance of no more than 3 mm, and the plane B intersects said surface of said stepped portion at a position E that is spaced apart a distance of no more than 3 mm from the surface A.

12. The impeller shell of the torque converter according to claim 11, wherein a corner portion is formed which extends between said curved inner peripheral surface of said main portion and said inner surface of said stepped portion, said corner portion having a radius of no more than 4 mm and being spaced apart from the nodal line C by a distance of no more than 1 mm.

13. A method of forming an impeller shell of the torque converter, comprising:

a first step of press forming a main portion, a connection portion, and a stepped portion wherein said main portion includes a curved inner peripheral surface for subsequently supporting a plurality of impeller blades, said connection portion having a cylindrical shape larger in diameter than an outer periphery of said curved inner peripheral surface of said main portion, said connection portion configured for attachment to a front cover of a torque convertor and said stepped portion being formed between said connection portion and a radial outer portion of said curved inner peripheral surface; and a second step including press forming on said stepped portion to form an inner surface a portion of which is generally parallel to a plane B which extends perpendicular to the central axis of the impeller shell and a corner portion which extends between said curved inner peripheral surface of said main portion and said inner surface of said stepped portion is formed with a radius that no more than about 4 mm.

14. The method of forming the impeller shell of the torque converter according to claim 13, wherein said main portion and said connection portion are axially moved relatively toward each other in said second step.

15. The method of forming the impeller shell of the torque converter according to claim 14, wherein a concavity is formed at the outer periphery of said main portion in said first step, and an engagement die having a convexity engageable with the concavity on said main portion is used such that the convexity of said engagement die is engaged with the concavity on said main portion for axially moving said main portion and said connection portion relatively toward each other in said second step.

* * * * *